No. 790,735. PATENTED MAY 23, 1905.
M. MARTIN.
TOOL FOR CUTTING HOLES IN METAL TANKS.
APPLICATION FILED MAR. 10, 1905.

Witnesses.
Edward H. Allen
S. Wm. Lutton

Inventor:
Morris Martin
by Crosby Gregory
attys.

No. 790,735.                                              Patented May 23, 1905.

UNITED STATES PATENT OFFICE.

MORRIS MARTIN, OF MALDEN, MASSACHUSETTS.

TOOL FOR CUTTING HOLES IN METAL TANKS.

SPECIFICATION forming part of Letters Patent No. 790,735, dated May 23, 1905.

Application filed March 10, 1905. Serial No. 249,384.

*To all whom it may concern:*

Be it known that I, MORRIS MARTIN, a citizen of the United States, and a resident of Malden, in the county of Middlesex and State of Massachusetts, have invented an Improvement in Tools for Cutting Holes in Metal Tanks, of which the following description, in connection with the accompanying drawings, is a specification, like characters on the drawings representing like parts.

This invention relates to a novel tool by means of which circular holes may be cut in metal tanks, many of which are used in autoboats and autocars. These tanks are usually made to hold gasolene, and the metal used in the tank is commonly punched to provide the same with a hole for the reception of a filling-bushing while the metal is in sheet form. Frequently these tanks have to be provided with a second hole for the reception of another bushing for a gage or other instrument. Considerable difficulty has been encountered in cutting in the tank a hole of the size required, and when this hole is made it is essential that chips, filings, &c., of metal shall not enter the tank; otherwise the gasolene is liable to be foul.

In accordance with my invention I have made a tool which may be set on the outside of the tank and will cut a hole therein.

The essential novelty of my tool consists in a foot which acts as a centering device, and this foot is soldered to the metal of the tank, so that when the cutter, to be described, cuts a circular groove in the tank and has cut some portion of said groove fully or substantially through the metal the foot may be tipped or wrenched over, taking with it the metal of the tank soldered to its lower end, thus removing a circular portion of the metal from the tank, leaving a hole of the desired size.

Figure 1:
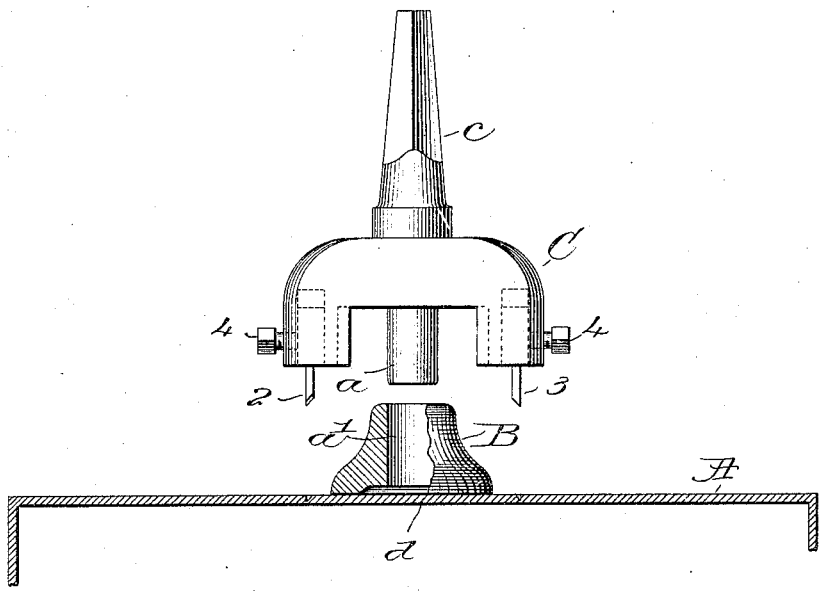
Figure 2:
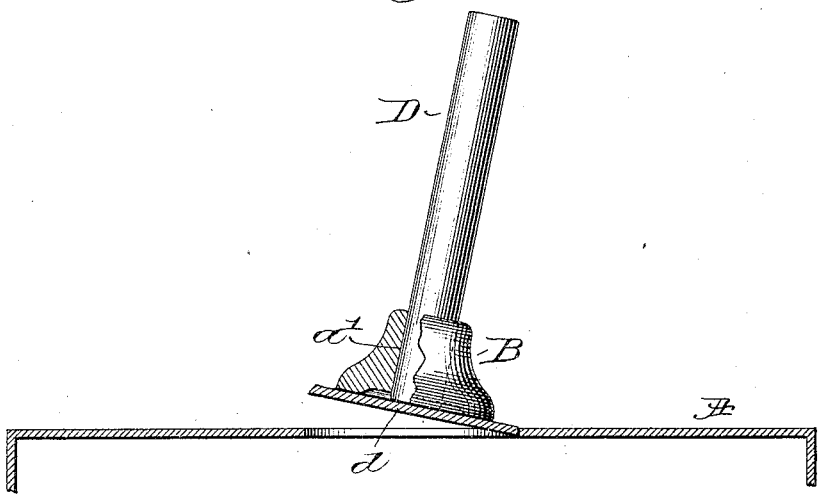

Figure 1 in a side elevation represents my improved tool, the foot being supposed to be soldered to the upper side of the metal of the tank. Fig. 2 shows the foot tipped over partially in the act of tearing out the circular portion of the tank to leave a hole therein.

Referring to the drawings, A represents part of a tank supposed to be sustained in a car or boat. To the upper side of this tank I solder the lower end of the foot or centering device B. The centering device is so constructed as to serve as a guide for the rotative tool-carrier C, provided with one or more cutting-tools 2 3, which are made adjustable in the carrier by means of suitable adjusting-screws 4. The carrier is shown as having a depending stud $a$, that enters the hole $a'$ in the centering device; but it is obvious that this might be just the reverse and the centering device might have the pin entering a hole in a suitable portion of the cutter-carrier.

The cutter-carrier or its center portion has its upper end $c$ shaped to be engaged by any usual brace or device by which to rotate the cutter-head about the centering device soldered to the tank, while the cutters act to cut a circular groove in the face of the metal of the tank. As soon as the cutters have entered the tank sufficiently to cut through the metal for any distance, so that a portion of the disk which is to be removed from the tank is cut through, then the operator will insert one end of a pin or lever D (shown in Fig. 2) in the hole of the centering device and will tip the same over from the vertical position that it occupied when the tools were cutting the circular groove, the tipping over of said centering device soldered to the metal of the can tearing out or removing from the can the metal that is soldered to the bottom of the soldering device. In this way a hole may be readily made in any metal tank and there is no liability of chips or metal filings getting into the tank.

Before using the centering device a second time the disk of metal $d$ torn out of a can and yet soldered to the lower end thereof must be removed and unsoldered, as will be obvious.

Having fully described my invention, what I claim as new, and desire to secure by Letters Patent, is—

In a tool of the class described, a centering device adapted to be soldered to the metal of a tank, and a cutter-head centered by said centering device and having a cutter, the rotation of the cutter-head cutting an annular groove in the metal of the tank so that when the centering device is tipped over said centering device will take with it and tear out of the metal of the tank a circular portion outlined by the cutters.

In testimony whereof I have signed my name to this specification in the presence of two subscribing witnesses.

MORRIS MARTIN.

Witnesses:
GEO. W. GREGORY,
MARGARET A. DUNN.